May 9, 1950 R. F. MARQUIS 2,507,033
DUMPING VEHICLE ASSEMBLAGE
Filed Feb. 19, 1948 2 Sheets-Sheet 1
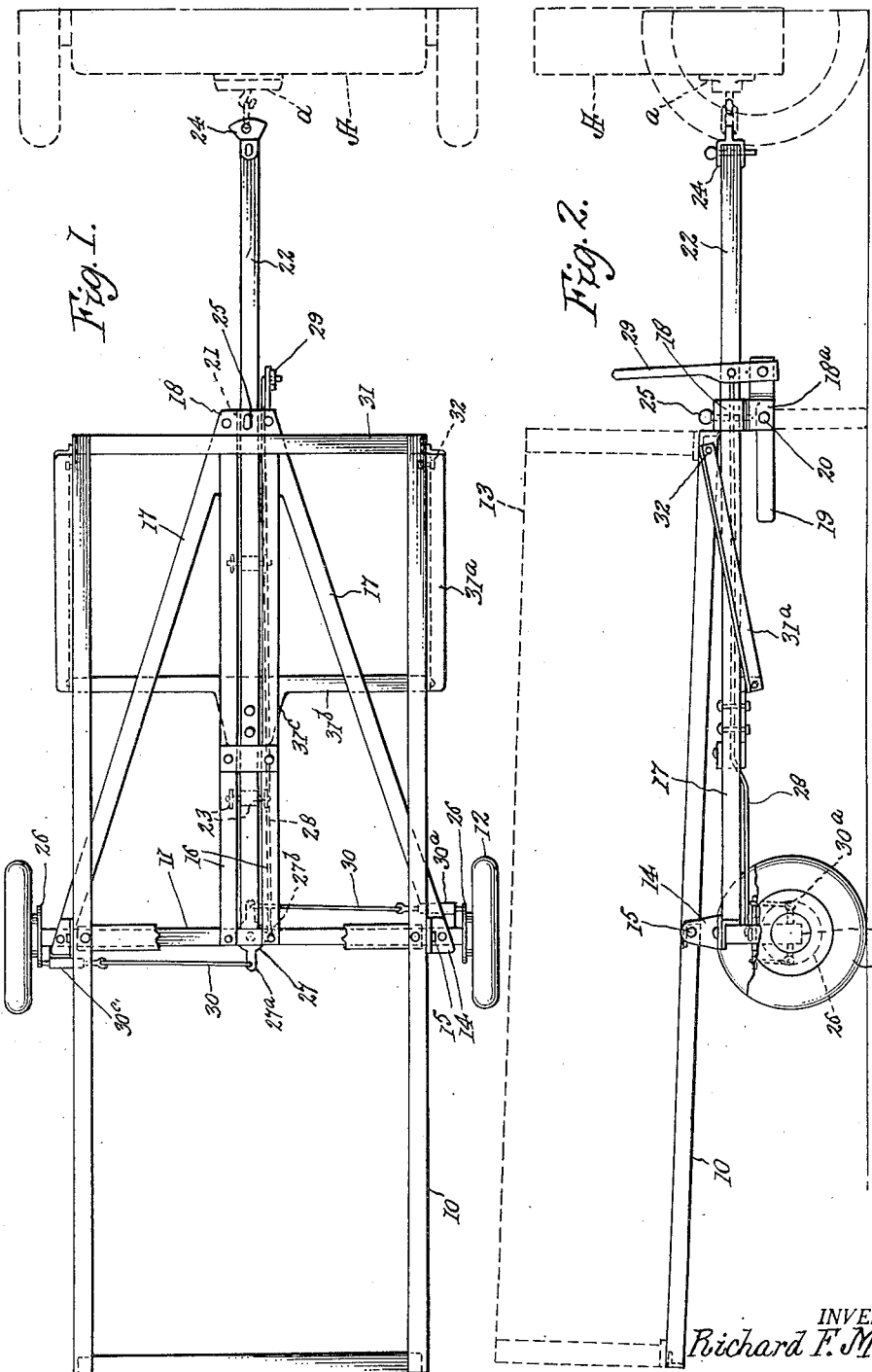
INVENTOR.
Richard F. Marquis
BY Frank C. Maley
Agent

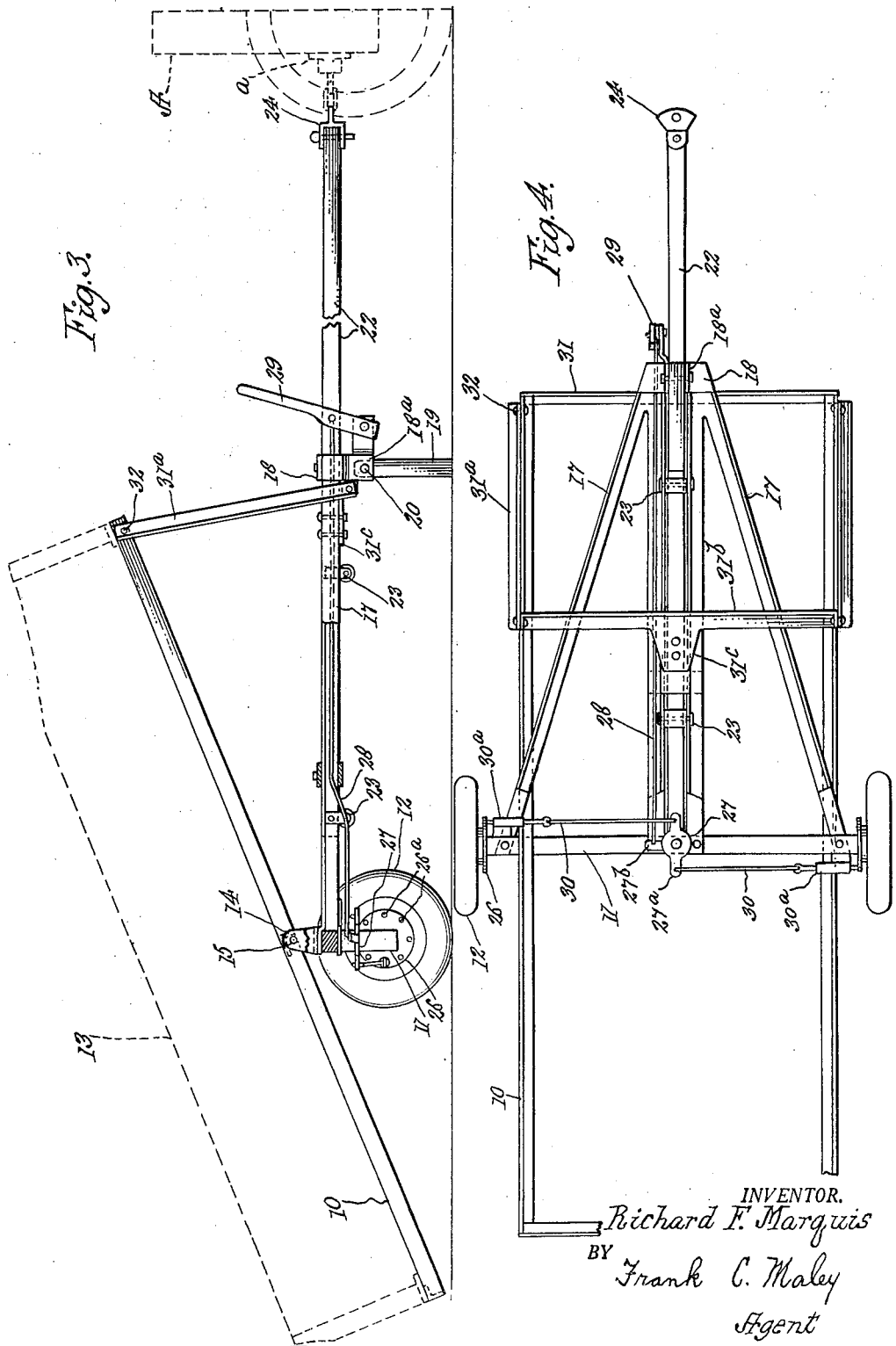

Patented May 9, 1950

2,507,033

UNITED STATES PATENT OFFICE 2,507,033

DUMPING VEHICLE ASSEMBLAGE

Richard Franklin Marquis, Bellefontaine, Ohio

Application February 19, 1948, Serial No. 9,355

8 Claims. (Cl. 298—20)

This invention relates to improvements in dumping vehicle assemblages, and pertains more particularly to assemblages of the power-drawn type exemplified, for instance by tractor-trailer combinations, although the assemblage may be utilized under conditions where the motive power is by animal power, the invention relating more particularly to the unit which is being drawn by the motive power.

Many different forms of vehicles of this type have been contemplated and employed commercially, a favorite form having a wheeled supporting structure on which the load-carrying body is supported to be properly positioned for traction purposes and then moved rearwardly to project over the rear of the supporting structure and in which position the body may be rocked by raising the forward end thus inclining the bed of the body downwardly toward the rear. Other forms have the rear zone pivoted on the supporting structure, the dumping being provided by bodily raising the forward end of the body, thus providing the inclination of the bed of the body.

With the first type, the body must be given its rearward movement to the dumping position when loaded to thereby establish a pivot point intermediate the ends of the body the latter presenting an advantage where the body is fully loaded, since a portion of the load weight is then in rear of the pivot and tends to counterbalance the load conditions and thus reduce the power requirements for raising the front end. After the load is dumped the body must be drawn forward to its traction position; where but a portion of the load is dumped, the partially-laden body must be given this return movement thus increasing the weight which must be drawn to its forward position. To provide these various activities the operating mechanisms and structures are necessarily of a complicated type so that the production and maintenance costs are large.

In the second type the body is simply raised on a rear pivot, but here the weight factor of the load becomes dominant, since the entire weight without any counterbalancing effect must be raised, although only the front end of the body is being raised. Various arrangements have been provided for producing and controlling the raising movements of the body forward end, a favorite method being by the use of hydraulic mechanisms which permit of a slow raising action which offers less disturbing relation to the load as the bed inclination develops. The structures of this type are necessarily of a complicated nature and of comparatively high cost, due to the character of the mechanisms which are required, in addition to which the power requirements are necessarily high.

The present invention is designed to produce the desired result through combining characteristics of both such types. There is a relative movement between the body and the power structure, as in the first type, but the relative movement is not provided by the movement of the body but by the power device: as a result, the position of the body relative to the supporting structure remains unchanged with respect to the length of the body, with the result that the body may have its normal position such as to set up the intermediate pivot relation between the body and supporting structure, as in such first type, but without the necessity of shifting the body lengthwise on the supporting structure as is required by such first type preliminary to producing the intermediate pivot effect: as a result, the load-counterbalancing effect is present as a normal condition. The rocking of the body on its pivot by raising the body front end, is produced by the advance of the power device with the wheeled supporting structure of the dumping vehicle locked against advance, and since the load is generally normally counterbalanced, the weight to be raised is comparatively small, as with the first type, and can be provided by the use of a greatly simplified motion-translating mechanism effective to efficiently raise the front end under controlled conditions by controlling the rate of advance of the power device. Hence, the position of the body relative to the supporting structure remains unchanged, as in the second type, but, in contrast with the latter type, the load weight is of the counterbalanced type, so that the power requirements are not excessive, thus contrasting with the second type. When the load is dumped, the body is lowered to its normal position by rearward movement of the power device.

The assemblage for producing these results is of a comparatively simple type, relatively inexpensive, and is efficient in operation, thus greatly reducing the production and maintenance costs. The details by which these results are secured are set forth hereinafter as the invention is specifically described.

To these and other ends, therefore, the nature of which will be more clearly set forth as the invention is hereinafter described, said invention consists in the improved constructions and combinations of parts as hereinafter particularly described, illustrated in the accompanying drawings, and more particularly pointed out in the appended claims.

In the accompanying drawings, in which similar reference characters indicate similar parts in each of the views, Figure 1 is a top plan view of the assemblage with the dumping vehicle shown in its normal traction status.

Figure 2 is a side elevation of the same.

Figure 3 is a longitudinal sectional view showing the assemblage in a dumping position.

Figure 4 is a bottom plan view with the parts shown in the position of Figure 1.

The invention, as disclosed herein, is shown applied to a trailer of the two-wheeled type, this offering the simpler form in which the principles of the invention are applicable, making the structure applicable for use in varied services, it being understood that, as disclosed, the trailer is designed to have its traction provided by a tractor of suitable type, to which the trailer is detachably connected, the tractor thus forming the front support for the trailer during the traction service. The trailer carries a manually-movable leg by means of which the trailer is supported when the tractor is disengaged, and also when the assembly is being manipulated for dumping purposes, as presently explained; the leg and the pair of wheels forming a three-point support which will efficiently maintain the trailer during its dumping activities.

In the drawings, the rear end of the tractor is shown in dotted lines at A, being equipped with suitable means a to which the tongue of the trailer may be detachably connected, the form of such tractor and the connection not being within the invention.

The trailer 10 is shown as having an axle 11, the intermediate portion of which is arranged to support the body, the drawings indicating that the axle is formed with a raised intermediate zone, produced in any desired form, the ends of the axle having the usual spindles to receive the wheels 12, the latter being shown, for illustrative purposes, as of the pneumatic-tire type. Since the trailer is not self-propelled, the wheels 12 may be of any preferred type.

The trailer body, indicated at 13 is of any preferred type as to form and dimensions, and is designed to be supported mainly by a pair of upwardly extending brackets 14, mounted on the axle 11 and so spaced as to receive the body width between them; the brackets and body being connected by pintles 15 or other suitable form of pivot structure which will permit the body to be rocked about the axes of the pintles; the latter being properly alined to permit such result. It is preferred that the body be so connected at a point slightly in rear of a mid-length point of the body to thereby place the greater body length as forward of the pivot point, but preferably so arranged as to tend to set up a counter-balanced effect as between the front and rear zones of the body; this permits the greater load weight to be forward of the pivot axis to thus normally retain the body in non-dumping position, as presently explained, but permitting ready dumping action by raising the front end with a minimum of effort, due to the counter-balancing trend set up by the load of the rear zone of the body.

The underbody supporting structure of the trailer may be of suitable type, a simple form of which is illustrated in the form of a pair of spaced apart members 16, extending forward from the mid-zone of the axle to a point formed of the front end of the body, a pair of diverging members 17 connecting the front end zones of the members 16 with end-zones of the axles, as indicated in Figures 1 and 4. This provides a skeleton frame leading forward from the axle to a point forward of the front end of the body, and on which such body front end rests when in non-dumping position. The front end zone of the assembly of members 16 and 17 is provided with a suitable housing 18 of any preferred form, the arrangement being such that it overlies the top and sides of the assembly and is arranged to underlie the assembly and produce a pair of downwardly-extending spaced apart ears 18a between which the upper end of a leg 19 is pivotally mounted on a pintle 20; the housing is so arranged as to also provide the walls of an opening 21 extending fore and aft between the members 16, the opening having angular sides and designed to form a passageway for tongue 22 presently referred to in detail. At a suitable point in the rearward zone of the length of members 16 the latter are bridged by suitable roller-bearing straps 23 which tend, with the members to form a second housing for the rear zone of the tongue.

The tongue 22 has an overall length materially greater than the length of members 16 to provide an extended forward portion which includes the complemental portion 24 of the hitch by which the trailer is connected to the tractor. During traction, the tongue rear end is in proximity to the rear ends of members 16, housing 18 and the tongue being provided with openings for the passage of a pin 25 therethrough, thus locking the tongue to the assembly and permitting the tractor to move the trailer bodily forward or backward; since the tongue is supported by the housing 18 and the straps 23, and is continuous to the tractor, it is apparent that with the pin 25 in position, the load weight of the forward zone of the body 13 is being supported by the tractor, at which time the leg 19 is in inactive position as shown in Figure 2. If, however, pin 25 be removed, advance of the tractor will simply draw the tongue forward—as in Figure 3—with a constantly increasing span distance between the trailer wheels and the rear end of the tractor, a condition that is not preferred because of the length of the span; the leg 19 is provided to meet the condition.

Since withdrawal of pin 25 breaks the normal traction relation between tractor and trailer, the pin is removed during the dumping operation it is essential that the trailer wheels be held locked at such time. Any suitable locking or braking mechanism, individual to the trailer, may be employed for the purpose, a simple arrangement being disclosed herein in the form of a locking assembly. In this arrangement each of the trailer wheels 12 has an inner plate 26 said plate carrying an annular series of openings 26a (Figure 3). Mounted relative to the mid-zone of axle 11 is a plate 27 pivotally supported by the axle, said plate carrying diametrically opposed projecting arms 27a and a third arm 27b, the latter normally extending in the direction of width of the trailer while arms 27a normally extend in a fore and aft direction; arm 27b provides a mounting for the rear end of a rod 28 which extends forwardly and has its forward end connected to a lever 29 pivoted within housing 18. Connected to an arm 27a is a rod 30 which extends transverse of the trailer length in the direction of plate 26 and its opening 26a, the rod being supported at an intermediate point on a member 30a, each arm 27a has an individual rod 30, the pair of rods being located on opposite sides of a vertical plane through axle 11, the rod from one arm extending in a direction opposite that of the rod from the other arm. Hence, the movement of plate 27 pivotally by movement of lever 29, through rod 28, will cause rods 30 to move toward and into an opening 26a of the plate 26 toward which the rod extends, thus locking the trailer wheel against rotation; reversal of the lever movement will release rods 30 from such engagement. Since the pin 25 and lever 29 are both carried by the housing 18, it is apparent that both are conveniently positioned to enable an operator to manipulate both while standing adjacent housing 18. And since the leg 19 is also carried in the housing zone, the leg can also be readily manipulated at the time the operator is so positioned.

The dumping action is provided by an approximately U-shaped frame 31, the legs 31a of which are so spaced apart that their free ends may be pivotally secured as at 32 to the opposite side faces of the forward end zone of the bed zone of the body 13; the connecting portion 31b of the frame is pivotally secured at each end to the pair of legs 31a and extends transverse of the trailer below members 16 and 17 and tongue 22, a mid-zone portion of the connection having a rearward extension 31c which is designed to be secured to the under side of tongue 22, the connection and extension being connected to the tongue at two spaced-apart points in the length of the latter, thus assuring rigid mounting of connection 31b; since the ends of the connection 31b are pivotally secured to the rear end zones of the legs 31a, the connection 31b can advance and retreat with the tongue 22, moving the rear end zones of legs 31a with the connection.

Due to this mounting of the frame 31, together with the pivotal mounting of body 13 and the fore and aft sliding movement of tongue 22, the frame serves to develop a mechanical movement effect of maximum importance in the dumping activities. This will be understood by a brief reference to the developments taking place when dumping action is to be provided. With the wheels 12 locked, leg 19 in its lowered position, and pin 25 removed, the tractor begins to advance, thus drawing the tongue 22 forward. The advance of the tongue correspondingly advances the rear ends of legs 31a in a horizontal plane, and since the front ends of the legs are secured to the body 13, the advance of the leg rear ends provides a power effect pushing in the direction of leg length by the frame; since the wheels 12 are locked, thus fixedly positioning the pivot axis of the body 13, the front ends of the leg are restrained from advancing by their connection with the body, the result being that such front ends can move only as such body connection permits with the movement arcuately about the body pivot point.

Hence, the pushing effect developed by the advancing tongue serves to raise the front end of the body 13 to swing the latter on its pivot, the rear zone of the body being lowered correspondingly. In other words, the upper ends of the legs tend to move rearwardly, under the restraint of the connection with the body, while the lower ends of the legs advance forward horizontally with the tongue, an action which inherently changes the angularity of the legs relative to the horizontal. In practice, the parts are so arranged that the legs normally extend angularly upward toward the front at an acute angle to the horizontal, this angle increasing as the tongue is advanced, the increase being such as to preferably carry the legs beyond the vertical, due to the fact that the front ends travel rearward while the lower rear ends travel forward, the movement continuing until the opposite ends first reach a vertical alignment and then pass beyond such point and tending to reverse the inclination of the legs, thus, in effect, passing the "dead center" point produced by the vertical alinement position and preventing the load weight from causing the frame to return. The advance of the tongue ends when connection 31b passes into contact with the rear of the ears 18a, the latter preventing further advance; in this position the body is at its maximum angularity for dumping purposes, as indicated in Figure 3.

As is apparent, such advancing movement of the tongue will be made by the movement of the tractor A which is drawing the tongue and, through the frame connections referred to as providing the power for raising the forward end of the body 13. The rate and timing of movement is entirely within the control of the tractor operator, so that the load can be discharged from the rear of the body as such operator may elect. Since each portion of the advance of the tongue within a definite range has a raising effect on the forward zone of the body, the manner in which the advancing movements of the tractor are controlled, determines the efficiency of the dumping action. In this respect, the manner in which the mechanical movement effect is developed through the particular structure disclosed, is of importance.

For instance, the rate of raising advance decreases as the tongue advances. On increments of equal length in the tongue advance, the initial increment will raise the front end of the body a distance at least double the increment length, with the second increment slightly more than the increment length, and with the raise less than the length produced by the third increment, the decrease continuing until the leg pivot points are vertically alined, the latter presenting the limit of the raising movement; in practice, the connection 31b reaches contact with ears 18a when the legs 31a extend practically perpendicular to the plane at which the body bed is then inclined, so that the lower end of the legs passes forward of such vertically-alined pivot position with a consequent slight lowering movement of the body to compensate for the excess; this condition serves to prevent the load weight from being effective to force return of the body to normal position.

As a result, the greater power value can be applied initially to begin the raising action at a time when the inclination of the bed to the horizontal is small with less likelihood of a shifting of the load, thus concentrating the power upon raising the weight of the load. As the angle of inclination of the bed increases, the tendency of the load to shift also increases; hence, the fact that the rate of raise decreases relative to the rate of advance of the tongue, as above explained, enables the operator to maintain his tractor rate of advance without causing undue increase in the shift tendency, since the rise rate is constantly decreasing during tongue advance. As a result the operator of the tractor is able to control the actual rise rate with greater ease and can manipulate his tractor advance with greater freedom since the rate of raise decreases while the rate of tongue advance is unchanged, a condition which enables the operator to accurately control the development of the bed inclination to meet the specific type of dumping desired, a matter of importance in many fields of service as where a load of coal is being dumped through the use of a chute of small dimensions; it is obvious that since the wheels of the trailer are locked, the weight of the tractor is sufficient to retain the frame 31 from recession at any intermediate point in the development of the raising movement so that the tractor operator can retain the body at any desired inclination at will, a condition which would permit complete dumping even though the frame 31 may not have reached its vertical position.

It will be understood, of course, that, after dumping, the body is returned to its normal position by simply backing the tractor, thus returning the tongue in the direction of its normal position, and therefore carrying the frame through its cycle of operation but in the reverse direction. When the tongue reaches its normal position pin 25 is re-inserted to lock the tongue in such position, preparing the parts for normal traction operation.

If desired, a special structure may be employed for manipulating leg 19, but leg manipulation without such structure is possible in simple manner. For instance, when the dumping point has been approximately reached, the leg is turned down manually into contact with the roadway, whereupon a slight backing by the tractor places the leg in its supporting position; the wheels 12 are then locked, pin 25 removed, and the load dumped as above indicated by the forward movement of the tractor. After dumping, the backward travel of the tractor restores the body 13 to normal position, after which pin 25 is reinserted and the wheel lock released, after which the tractor advances sufficient to move the leg from its vertical supporting position, after which it is manually returned to its inactive position.

It will be understood that the specific form of wheel locking means disclosed, is deemed illustrative only, any desired form of wheel anchoring structure being usable; for instance, a brake structure may be employed.

While I have shown the trailer as of the two-wheel type, and this is preferred, it will be understood, that the invention may also be utilized in connection with four-wheel trailers. The two-wheel type has the advantage of permitting mounting of the body 13 in such manner as to produce the counterbalancing effect referred to above, thus reducing the load weight values required to be raised by the operation described, as well as permitting the use of the simplified form of structure described.

As will be understood, the assembly is such as can be readily formed of simple cross-sectional forms of metallic members, thus enabling the construction of an assembly of great strength and yet be of comparatively light weight characteristic, an important advantage under service condition.

While I have herein shown and described a preferred form of the invention, it will be understood that changes and modifications therein may be found desirable or essential in meeting the exigencies of use or the individual preferences of a user; I therefore reserve the right to make any and all such changes and/or modifications as may be found desirable or essential, insofar as the same may fall within the spirit and scope of the invention as presented in the accompanying claims, when broadly construed.

What is claimed as new is:

1. In dumping trailer assemblages, wherein the trailer is normally given its traction by a power source, a trailer assembly having a wheeled underbody formation, a body supported thereon and pivotally mounted to permit body movement between a normal traction position and a maximum dumping position, said underbody formation including an elongated tongue having its forward end removably connected with such power source, said tongue being anchored to the underbody structure during traction and freed from such anchoring during dumping activities to thereby permit fore and aft movements of the tongue relative to the underbody structure by power source traction activity, and means comprising a skeleton element of constant dimensions operatively connecting said tongue and the forward zone of the body, the tongue-borne end of the element being movable in a linear path by tongue movement and the body-borne end being pivoted to the body in fixed location and being movable in an arcuate path with the body to thereby swing the body arcuately about its pivot by tongue linear movements produced by power source traction activity.

2. An assemblage as in claim 1 characterized in that the underbody formation has its wheeled structure in the form of an axle carrying a pair of wheels, the position of the axle relative to the length of the body being in approximate vertical alinement with the body pivot, the position approaching and being in rear of a vertical plane bisecting the length of the body to thereby provide a substantial counterbalanced characteristic to the supported body with the major weight value forward of the body pivot, the major portion of the element lying below the plane of the body and forward of the axle.

3. An assembly as in claim 1 characterized in that the underbody formation includes a pair of spaced-apart parallel members extending in fore and aft direction in the mid-zone width of the formation from a position approximating a vertical plane through the body pivots to a position beyond the advance end of the body, with the forward end zones of the members located within a housing mounted forward of the body, said members forming side walls of a channel within which the tongue is movable linearly with the members carrying rollers above and below the tongue spaced apart in the direction of length of the members to complete the tongue channel characteristic.

4. An assemblage as in claim 3 characterized in that the anchoring means for the tongue is in the form of a removable pin positionable in openings of the housing and an opening of the tongue with the positioned pin active to establish traction conditions between the power source and the trailer and its removal serving to release the tongue for action within the dumping activities produced by power source traction.

5. An assemblage as in claim 4 characterized in that the housing includes a pair of spaced-apart downwardly-extending ears forming a support for a pivotally mounted leg movable between an inactive position and a position to support the forward end zone of the trailer during the dumping activities.

6. An assemblage as in claim 1 characterized in that the means is in the form of an approximately U-shaped element having the free end zones of its legs pivotally secured in fixed position to opposite sides of the forward zone of the body with the leg-connecting portion of the element underlying the path of travel of the tongue with the mid-zone of the length of the connecting portion secured to the under face of the tongue.

7. An assemblage as in claim 6 characterized in that the leg connecting portion and the legs are connected pivotally to thereby permit the connecting portion to move with the tongue during the linear travel of the latter, legs being swingable bodily in a non-pivotal path controlled by the linear movement of the tongue and the pivotal mounting of the body to provide the pivotal movement of the body during dumping activities, the leg swinging movements presenting the body-borne ends of the legs as movable in directions generally opposite to the direction of movement of the leg ends borne by the leg-connecting portion.

8. An assemblage as in claim 7 characterized in that the underbody formation includes a housing forward of the front end of the body, and further characterized in that the advancing movement of the tongue during dumping activities is limited by engagement of the connecting portion of the element with such housing, whereby the travel of the legs in presence of tongue advance will controllably swing the body on its pivot by raising the body front end zone, the travel path of the legs including a position normal to the linear path of travel of the tongue during movement of the connecting portion to its position of engagement with the housing.

RICHARD FRANKLIN MARQUIS.

REFERENCES CITED

The following references are of record in the file of this patent:

UNITED STATES PATENTS

| Number | Name | Date |
|---|---|---|
| 994,718 | Bushnell | June 13, 1911 |
| 1,400,752 | Land, Jr. | Dec. 20, 1921 |

FOREIGN PATENTS

| Number | Country | Date |
|---|---|---|
| 653,342 | France | Nov. 8, 1928 |